United States Patent
Fang et al.

(10) Patent No.: US 11,992,968 B2
(45) Date of Patent: May 28, 2024

(54) METHOD FOR MANUFACTURING A WIND TURBINE TOWER STRUCTURE BASED ON WIND DIRECTION

(71) Applicant: General Electric Company, Schenectady, NY (US)

(72) Inventors: Biao Fang, Clifton Park, NY (US); Norman Arnold Turnquist, Carlisle, NY (US); Gregory Edward Cooper, Greenfield Center, NY (US); Pascal Meyer, Burnt Hills, NY (US)

(73) Assignee: GE Infrastructure Technology LLC, Greenville, SC (US)

( * ) Notice: Subject to any disclaimer, the term of this patent is extended or adjusted under 35 U.S.C. 154(b) by 525 days.

(21) Appl. No.: 17/278,837

(22) PCT Filed: Sep. 28, 2018

(86) PCT No.: PCT/US2018/053440
§ 371 (c)(1),
(2) Date: Mar. 23, 2021

(87) PCT Pub. No.: WO2020/068116
PCT Pub. Date: Apr. 2, 2020

(65) Prior Publication Data
US 2022/0032496 A1   Feb. 3, 2022

(51) Int. Cl.
*B28B 1/00* (2006.01)
*B33Y 10/00* (2015.01)
(Continued)

(52) U.S. Cl.
CPC .............. *B28B 1/001* (2013.01); *B33Y 10/00* (2014.12); *B33Y 80/00* (2014.12); *E04H 12/12* (2013.01);
(Continued)

(58) Field of Classification Search
CPC .................................................. E04H 12/341
See application file for complete search history.

(56) References Cited

U.S. PATENT DOCUMENTS

| 6,945,003 B2 | 9/2005 | Berry |
| 7,160,085 B2 | 1/2007 | de Roest |

(Continued)

FOREIGN PATENT DOCUMENTS

| CN | 106437152 A | 2/2017 |
| EP | 2574772 A1 | 4/2013 |

(Continued)

OTHER PUBLICATIONS

PCT International Search Report Corresponding to PCT/US2018/053440 dated Jun. 24, 2019.

(Continued)

*Primary Examiner* — Timothy Kennedy
(74) *Attorney, Agent, or Firm* — Dority & Manning, P.A.

(57) ABSTRACT

A method for manufacturing a tower structure of a wind turbine at a wind turbine site. The method includes determining an optimized shape of the tower structure based on one or more site parameters. Further, the optimized shape of the tower structure is non-symmetrical. In a further step, the method include printing, via an additive printing device, the optimized shape of the tower structure of the wind turbine at the wind turbine site, at least in part, of a cementitious material. In addition, the method includes allowing the cementitious material to cure so as to form the tower structure of the wind turbine.

17 Claims, 10 Drawing Sheets

(51) Int. Cl.
- B33Y 80/00 (2015.01)
- E04H 12/12 (2006.01)
- E04H 12/34 (2006.01)
- F03D 13/10 (2016.01)
- F03D 13/20 (2016.01)
- G01P 13/02 (2006.01)

(52) U.S. Cl.
CPC ........... *E04H 12/341* (2013.01); *F03D 13/10* (2016.05); *F03D 13/20* (2016.05); *F05B 2230/50* (2013.01); *F05B 2280/702* (2013.01); *G01P 13/02* (2013.01)

(56) References Cited

U.S. PATENT DOCUMENTS

| | | | |
|---|---|---|---|
| 7,400,057 B2 | 7/2008 | Sureshan | |
| 7,874,825 B2 * | 1/2011 | Khoshnevis | E04G 21/0463 425/114 |
| 7,878,789 B2 * | 2/2011 | Khoshnevis | B28B 1/001 425/461 |
| 8,937,399 B2 | 1/2015 | Freda | |
| 9,121,390 B2 | 9/2015 | Prass | |
| 9,777,491 B2 * | 10/2017 | Grivetti | E04G 21/0436 |
| 9,938,685 B2 | 4/2018 | Krause | |
| 2007/0138678 A1 * | 6/2007 | Khoshnevis | E04B 1/3505 52/561 |
| 2009/0031639 A1 * | 2/2009 | Cortina/Cordero | E04H 12/12 52/745.18 |
| 2010/0071301 A1 * | 3/2010 | Herrius de Roest | F03D 13/20 52/651.07 |
| 2010/0112119 A1 * | 5/2010 | Khoshnevis | B29C 48/06 425/432 |
| 2011/0142680 A1 | 6/2011 | Numajiri | |
| 2012/0159785 A1 | 6/2012 | Pyles et al. | |
| 2013/0030772 A1 | 1/2013 | Laurberg et al. | |
| 2013/0212972 A1 | 8/2013 | Kawabata | |
| 2015/0059408 A1 * | 3/2015 | Abushaev | B33Y 30/00 65/181 |
| 2015/0300036 A1 | 10/2015 | Khoshnevis | |
| 2016/0263822 A1 * | 9/2016 | Boyd, IV | B32B 27/00 |
| 2016/0361834 A1 * | 12/2016 | Chen-Iun-Tai | B33Y 30/00 |
| 2017/0016244 A1 | 1/2017 | Keller et al. | |
| 2017/0021527 A1 * | 1/2017 | Grivetti | E04G 21/0436 |
| 2018/0036792 A1 | 2/2018 | Tallman | |
| 2018/0066441 A1 * | 3/2018 | Chen-Iun-Tai | E04G 21/0427 |
| 2018/0071949 A1 * | 3/2018 | Giles | B28B 1/001 |

FOREIGN PATENT DOCUMENTS

| | | | |
|---|---|---|---|
| KR | 20130017951 A | 2/2013 | |
| WO | WO-2005070657 A1 * | 8/2005 | ........... B29C 64/106 |

OTHER PUBLICATIONS

Fuglsang et al., Site-Specific Design Optimization of Wind Turbines, Wind Energy, vol. 5, Issue 4, Aug. 23, 2002, pp. 261-279. https://doi.org/10.1002/we.61.

Negm et al., Structural Design Optimization of Wind Turbine Towers, Science Direct Computers & Structures, vol. 74, Issue 6, Feb. 1, 2000, pp. 649-666. https://doi.org/10.1016/S0045-7949(99)00079-6.

The India First Examination Report for IN application No. 202117011590, dated Sep. 9, 2022.

Chinese Office Action, Oct. 31, 2023.

* cited by examiner

METHOD FOR MANUFACTURING A WIND TURBINE TOWER STRUCTURE BASED ON WIND DIRECTION

FIELD

The present disclosure relates in general to wind turbines, and more particularly to methods for additively manufacturing wind turbine tower structures that are optimized for the predominate wind direction at the wind turbine.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is generally constructed of steel tubes, pre-fabricated concrete sections, or combinations thereof. Further, the tubes and/or concrete sections are typically formed off-site, shipped on-site, and then arranged together to erect the tower. For example, one manufacturing method includes forming pre-cast concrete rings, shipping the rings to the site, arranging the rings atop one another, and then securing the rings together. As wind turbines continue to grow in size, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting. Such methods, however, require extensive labor and can be time-consuming.

In addition, typical wind turbine towers are symmetrical so as to support various aerodynamic forces acting on the wind turbine (e.g., rotor blades) from all directions. However, individual wind turbines are generally oriented toward a predominate wind direction. As such, aerodynamic forces acting on a single wind turbine generally load the tower in the direction of the predominate wind direction. Thus, symmetrical towers may unnecessarily support the wind turbine from loads perpendicular to the predominate wind direction. In addition, symmetrical towers may include unnecessary support structures and/or support materials that may increase the weight and cost thereof.

In view of the foregoing, the art is continually seeking improved methods for manufacturing wind turbine towers. Accordingly, the present disclosure is directed to methods for manufacturing wind turbine tower structures that address the aforementioned issues. In particular, the present disclosure is directed to methods for manufacturing wind turbine tower structures optimized for the predominate wind direction.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure of a wind turbine at a wind turbine site. The method includes determining an optimized shape of the tower structure based on one or more site parameters. Further, the optimized shape of the tower structure is non-symmetrical. In a further step, the method includes printing, via an additive printing device, the optimized shape of the tower structure of the wind turbine at the wind turbine site, at least in part, of a cementitious material. In addition, the method includes allowing the cementitious material to cure so as to form the tower structure of the wind turbine.

In one embodiment, the site parameter(s) may include a predominate wind direction. In such an embodiment, the method may include determining the predominate wind direction at the wind turbine site. In a further embodiment, determining the predominate wind direction may further include monitoring, via one or more sensors, one or more wind parameters at the wind turbine. In such an embodiment, the predominate wind direction may be determined via a controller communicatively coupled to the one or more sensors. As such, the predominate wind direction of the wind turbine may be determined based on the monitored wind parameter(s).

In an additional embodiment, portions of the optimized shape of the tower structure that are aligned with the predominate wind direction may be thicker than portions of the optimized shape offset from the predominate wind direction. In another embodiment, the optimized shape of the tower structure may define a cross-sectional shape including at least one of an I-beam cross-section, a box beam cross-section, or an elliptical cross-section. In one such embodiment, the elliptical cross-section may define a longitudinal axis that aligns with the predominate wind direction. In a still further embodiment, the method may include printing, via the additive printing device, one or more stiffening members onto an inner surface of the tower structure to form the optimized shape.

In one particular embodiment, the method may include providing one or more molds on a foundation of the wind turbine. In such an embodiment, the method may further include forming, via the additive printing device, the optimized shape of the tower structure of the wind turbine within the one or more molds. In another such embodiment, the method may further include printing, via the additive printing device, the one or more molds. In a further embodiment, during printing, the method may further include embedding one or more reinforcement elements at least partially within the cementitious material of the tower structure at one or more locations.

In another aspect, the present disclosure is directed to a method for manufacturing a tower structure of a wind turbine at a wind turbine site. The method includes determining a predominate wind direction at the wind turbine site. Additionally, the method includes determining an optimized shape of the tower structure based on the predominate wind direction. Further, the optimized shape of the tower structure is non-symmetrical. The method also includes printing, via an additive printing device, one or more molds on a foundation of the wind turbine. Further, the one or more molds define the optimized shape of the tower structure. Another step of the method includes filling the one or more molds, at least in part, with a cementitious material. The method further includes curing the cementitious material within the one or more molds so as to form the tower structure.

In one embodiment, filling the one or more molds with a cementitious material may further include printing, via an additive printing device, the cementitious material within the one or more molds. Printing the cementitious material within the one or more molds may further include building up the cementitious material of the tower structure in multiple passes via the additive printing device. In another embodiment, filling the one or more molds with a cementitious material may further include dispensing, via a nozzle of the additive printing device, the cementitious material within the one or more molds. In a further embodiment, the optimized shape of the tower structure may define one or more stiffening members on an inner surface of the tower structure to form the optimized shape. It should be understood that the method may further include any of the additional features as described herein.

In a further aspect, the present disclosure is directed to a method for manufacturing a tower structure of a wind turbine at a wind turbine site. The method includes determining a predominate wind direction at the wind turbine site. Additionally, the method includes determining an optimized shape of the tower structure based on the predominate wind direction. Further, the optimized shape of the tower structure is non-symmetrical. In a further step, the method includes forming the optimized shape of the tower structure of the wind turbine at the wind turbine site, at least in part, of a cementitious material. It should be understood that the method may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to methods for manufacturing wind turbine towers including shapes of a tower structure optimized for a predominate wind direction. Such methods include using automated deposition of cementitious materials via technologies such as additive manufacturing, 3-D Printing, spray deposition, extrusion additive manufacturing, concrete printing, automated fiber deposition, as well as other techniques that utilize computer numeric control and multiple degrees of freedom to deposit material. More specifically, methods of the present disclosure include printing and/or embedding cementitious materials into a shape optimized for the predominate wind direction. Thus, in several embodiments, the shape of the tower structure may include thicker portions oriented along the predominate wind direction, such as an I-beam and/or a box-beam oriented along the predominate wind direction, an ellipse oriented along the predominate wind direction, an optimized cross-sectional shape oriented along the predominate wind direction, one or more stiffening members on an inner surface of the tower structure in the predominate wind direction, and/or any other suitable optimized shape.

Thus, the methods described herein provide many advantages not present in the prior art. For example, the optimized shape of the tower structure may be configured to compensate for greater loads along the predominate wind direction compared to other orientations (e.g., perpendicular to the predominate wind direction). By optimizing the shape of the tower structure, the tower structure can be manufactured with less overall material, saving costs, while still satisfying the loading requirements on the wind turbine. Further, by determining the predominate wind direction at a tower site and printing the tower structure at the tower site, the tower structure may be optimized for the predominate wind direction at the tower site. It should be recognized that printing the tower structure at the tower site may reduce labor costs as well as transportation costs associated with components of a prefabricated tower structure.

Figure 1:
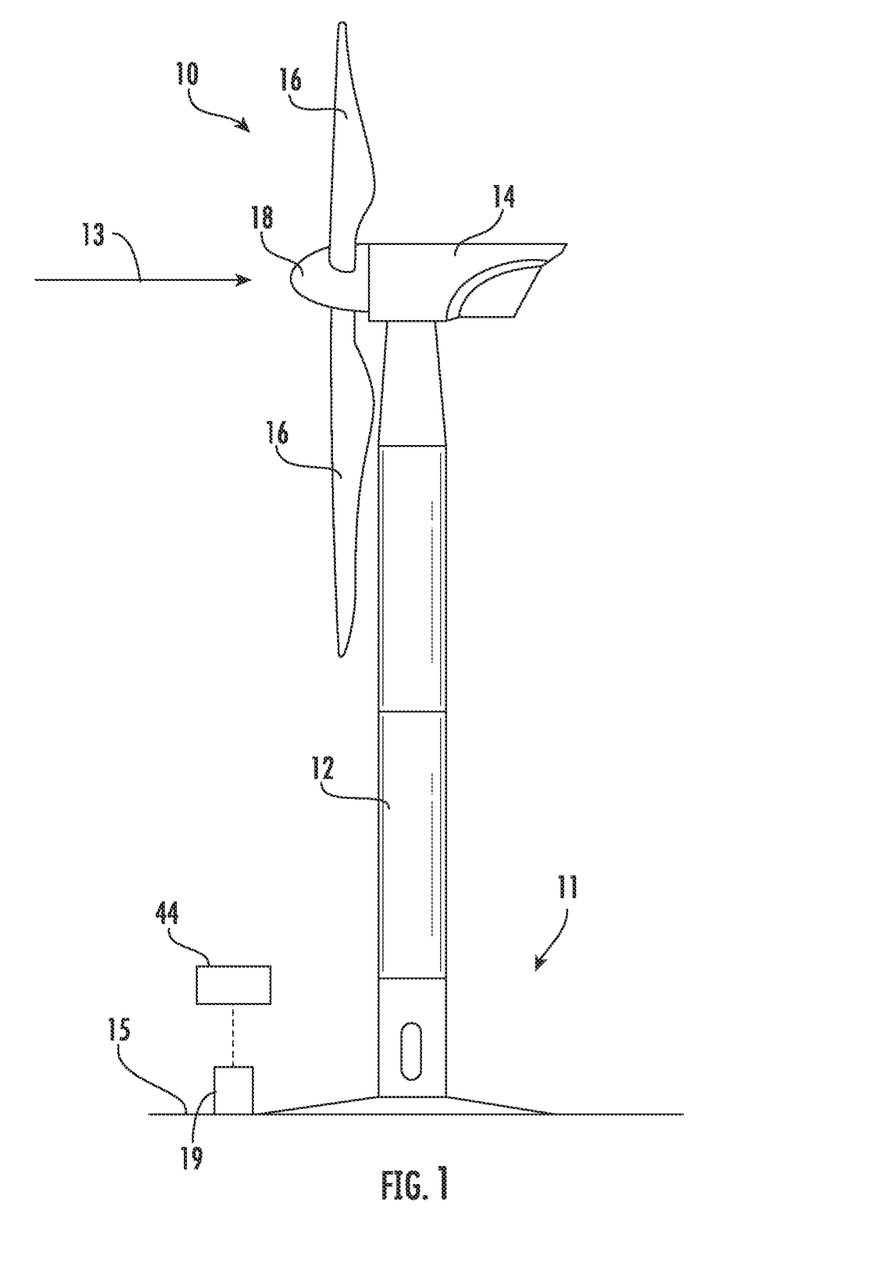
FIG. 1 illustrates a perspective view of one embodiment of a wind turbine according to the present disclosure.

Referring now to the drawings, FIG. 1 illustrates a perspective view of one embodiment of a wind turbine 10 at a wind turbine site 11 according to the present disclosure. As shown, the wind turbine 10 includes a tower 12 (also referred to herein as a tower structure) extending from a foundation 15 or support surface with a nacelle 14 mounted atop the tower 12. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration. In addition, the present invention is not limited to use with wind turbine towers, but may be utilized in any application having concrete constructions and/or tall towers in addition to wind towers, including, for example, homes, bridges, tall towers, and other aspects of the concrete industry. Further, the methods described herein may also apply to manufacturing any similar structure that benefits from the advantages described herein.

As further illustrated in FIG. 1, the wind turbine 10 may be oriented based on one or more site parameters. For instance, the site parameter(s) may include an elevation and/or site terrain at the wind turbine site 10. The site parameter(s) may also include a wind speed, wind direction, and/or wind shear at the wind turbine site 11. Particularly, in several embodiments, the wind turbine 10 may be oriented toward a predominate wind direction 13 at the wind turbine site 11. For instance, the rotor 18 (e.g., the rotor blades 16) may be oriented toward the predominate wind direction 13 in order to efficiently convert kinetic energy of the wind into mechanical energy, e.g., to drive the main rotor shaft. Further, the wind turbine 10 may be oriented toward the predominate wind direction 13 based on historical data. More particularly, historic data indicating the real-time wind directions may be utilized to determine the predominate wind direction 13. For example, a spectrum of wind direction distributions may be used to determine the predominate wind direction 13 before the starting construction of the tower 12.

In certain situations, the predominate wind direction 13 at the wind turbine site 11 may be unknown. As such, the predominate wind direction 13 may need to be determined. Thus, as shown, the wind turbine 10 may include a controller 44 configured to determine the predominate wind direction 13. In addition, as shown, the wind turbine 10 may include one or more sensors 19 communicatively coupled to the controller 44 for monitoring one or more wind parameters at the wind turbine site 11. In certain embodiments, the sensor 19 may be positioned on a mast or post to determine the predominate wind direction 13 along the height of the tower 12.

Thus, the controller 44 is configured to receive sensor signals from the sensor(s) 19 that can be used to determine the predominate wind direction 13. For example, a series of recorded real-time wind directions may be processed to determine the predominate wind direction 13. Further, the sensor(s) 19 may include one or more wind vanes. Further, the wind parameter(s) may include a current wind direction. In another embodiment, the sensor(s) 19 may include an anemometer configured to determine both the wind direction and the wind speed at the wind turbine site 11. In certain embodiments, the controller 44 may utilize computational fluid dynamics (CFD) procedures to determine the predominate wind direction 13 at the foundation 15 and/or along the tower 12.

Figure 2:
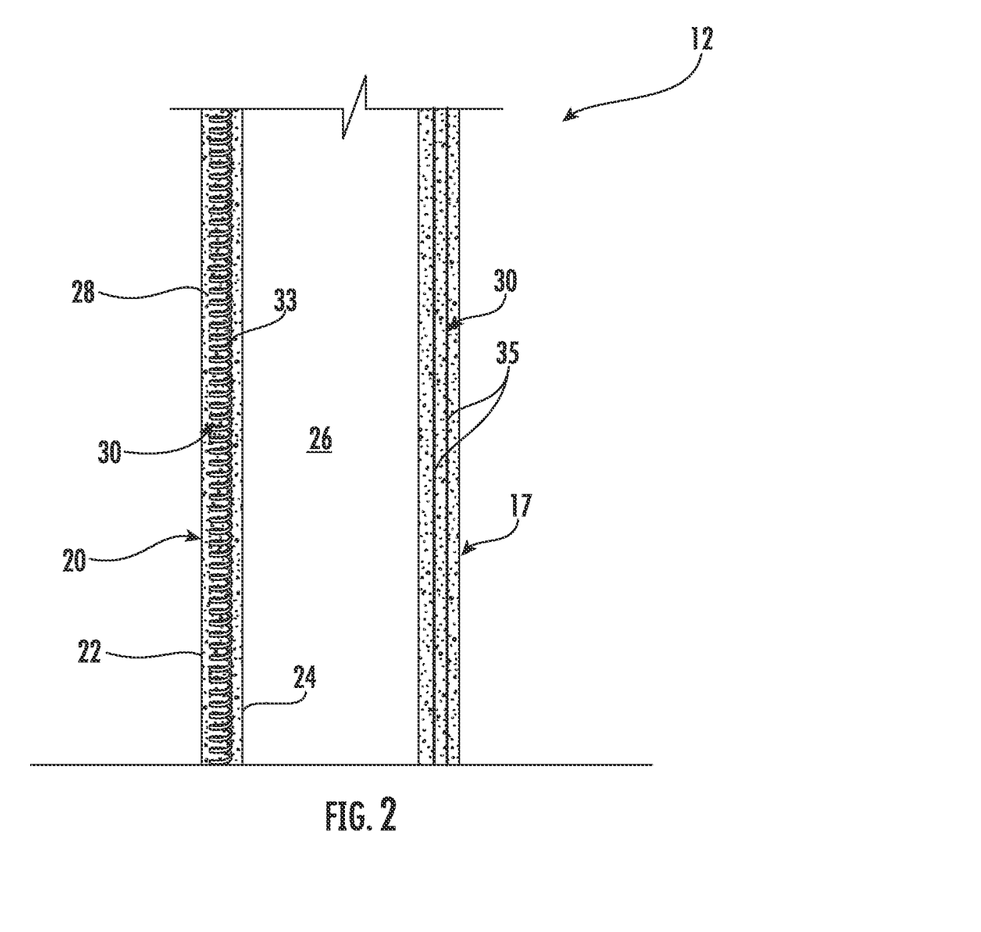
FIG. 2 illustrates a partial, cross-sectional view of one embodiment of a tower structure for a wind turbine manufactured with an additive printing device according to the present disclosure.

Referring now to FIG. 2, one embodiment of the tower structure 12 is illustrated in accordance with aspects of the present disclosure. Particularly, FIG. 2 illustrates a partial, cross-sectional view of one embodiment of the tower structure 12 of the wind turbine 10. As shown, the illustrated tower 12 defines the tower wall 20 having an outer surface 22 and an inner surface 24. Further, as shown, the tower wall 20 generally defines a hollow interior 26 that is commonly used to house various turbine components (e.g. a power converter, transformer, etc.). In addition, as will be described in more detail below, the tower structure 12 may be formed, at least in part, using additive manufacturing. Moreover, as shown, the tower structure 12 is formed, at least in part, of a cementitious material 28. In addition, the tower structure 12 may define an optimized shape 17, such as any of the shapes described below in regards to FIGS. 3-8. Further, the tower structure 12 may have a variable optimized shape along the height of the tower structure 12. For example, the tower structure may include two or more of optimized shapes 17 of FIGS. 3-8 at different positions along the height of the tower structure 12.

Further, in certain embodiments, the tower structure 12 may also include one more reinforcement elements 30. In particular embodiments, the reinforcement element(s) 30 may include, for example, one or more reinforcing sensors, elongated cables or wires, helical cables or wires, reinforcing bars (also referred to as rebar), (hollow or solid), reinforcing fibers (metallic or polymeric), reinforcing metallic rings (circular, oval, spiral and others as may be relevant) or couplings, mesh, and/or any such structures as may be known in the art to reinforce concrete structures. For example, as shown in FIG. 2, the tower structure 12 includes a helical cable 33 and a plurality of pre-tensioned linear cables 35 embedded in the cementitious material 28. In addition, as used herein, the cementitious material 28 may include any suitable workable paste that is configured to bind together after curing to form a structure. Suitable cementitious materials include, for example, concrete, pitch resin, asphalt, clay, cement, cementitious compositions, or similar.

Referring now to FIGS. 3-8, multiple cross-sections of several embodiments of tower structures 12 of a tower, such as the tower 12 of FIG. 1, are illustrated in accordance with aspects of the present subject matter. As shown, the tower structure 12 defines tower wall 20 defining an exterior shape of the tower 12 (see, e.g., FIG. 1). More particularly, as shown, the tower wall 20 of the illustrated embodiments define an optimized shape 17 based on one or more site parameters, such as the predominate wind direction 13. Further, as shown, the optimized shape 17 of the tower structure 12 is non-symmetrical. For example, in certain embodiments, the optimized shape 17 of the tower structure 12 may define a second moment of area along the predominate wind direction 13 greater than a second moment of area perpendicular to the predominate wind direction 13. Generally, the second moment of area provides an indication of a structure's resistance to bending to an applied moment, force, or load perpendicular to a neutral axis as a function of its shape. In other words, a greater second moment of area along the predominate wind direction 13 may increase a bending stiffness of the tower structure 12 along the predominate wind direction 13. As such, various embodiments of the optimized shape 17 described herein are configured to allow the tower structure 12 to withstand greater loads oriented along the predominate wind direction 13 compared to an ability of the tower structure 12 to withstand loads at other orientations (e.g., perpendicular to the predominate wind direction 13).

Figure 3:
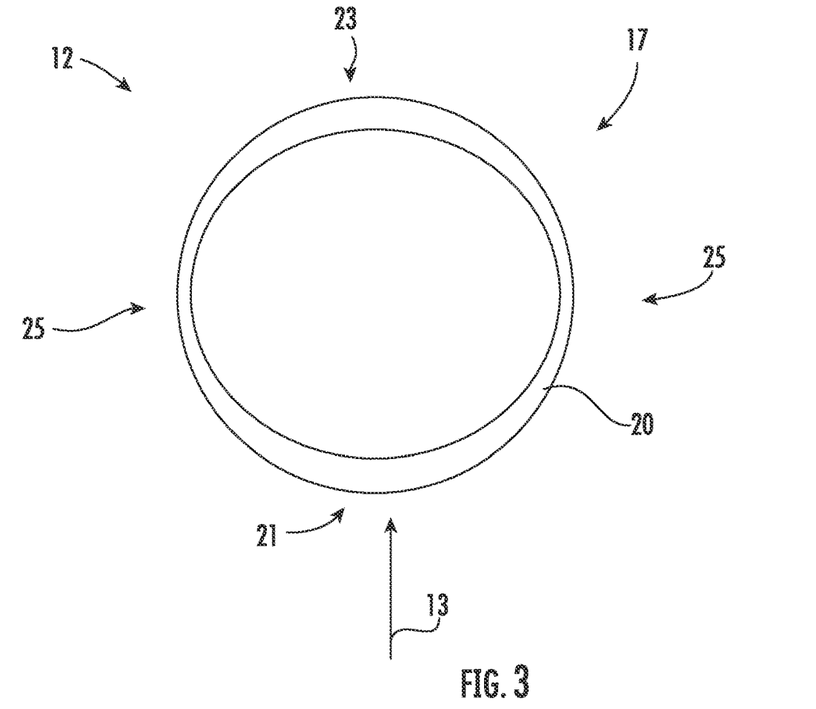
FIG. 3 illustrates one embodiment of a tower structure in accordance with aspects of the present disclosure, particularly illustrating a cross-section of an optimized tower structure including thicker portions aligned with the predominate wind direction compared to portions offset from the predominate wind direction.

Referring specifically to FIG. 3, one embodiment of the tower structure 12 is illustrated in accordance with aspects of the present disclosure. Particularly, FIG. 3 illustrates one embodiment of a cross-section of the optimized tower structure 12 where upstream and downstream portions 21, 23 of the tower structure 12 are thicker than side or offset portions 25 of the tower structure 12. In addition, as shown, the upstream and downstream portions 21, 23 of the tower structure 12 align with the predominate wind direction 13. As such, it should be appreciated that thicker upstream and/or downstream portions 21, 23 may increase the second moment of area along the predominate wind direction 13, and thus increase the bending stiffness along the predominate wind direction 13.

Figure 4:
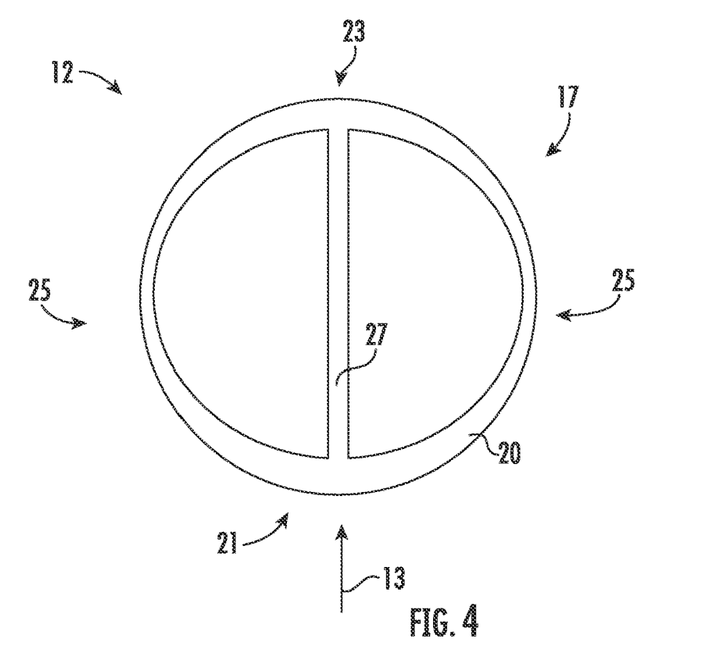
FIG. 4 illustrates another embodiment of the tower structure in accordance with aspects of the present disclosure, particularly illustrating a cross-section of the optimized tower structure including an I-beam cross-section within the tower structure.

Referring now to FIG. 4, another embodiment of the tower structure 12 is illustrated in accordance with aspects of the present disclosure. Particularly, FIG. 4 illustrates one embodiment of a cross-section of the optimized tower structure 12 including an I-beam cross-section within the tower structure 12. As illustrated, the cross-sectional shape may be oriented along the predominate wind direction 13 to increase the bending stiffness of the tower structure 12 to loads along the predominate wind direction 13. For example, as shown, the I-beam cross-section may include a cross-beam 27 extending between the upstream portion 21 and the downstream portion 23 of the tower wall 20. In addition, as shown, the cross-beam 27 may extend generally parallel with the predominate wind direction 13.

Figure 5:
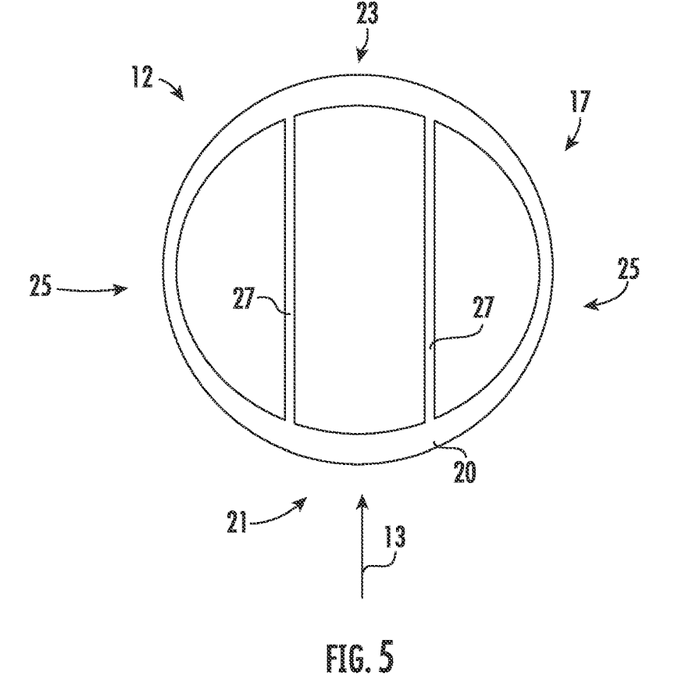
FIG. 5 illustrates another embodiment of the tower structure in accordance with aspects of the present disclosure, particularly illustrating a cross-section of the optimized tower structure including a box-beam cross-section within the tower structure.

Referring now to FIG. 5, another embodiment of the tower structure 12 is illustrated in accordance with aspects of the present disclosure. Particularly, FIG. 5 illustrates a cross-section of the optimized tower structure 12 including a box-beam cross-section within the tower structure 12. As illustrated, the cross-sectional shape may be oriented along the predominate wind direction 13 to increase the bending stiffness of the tower structure 12 to loads along the predominate wind direction 13. Further, as shown, the box-beam cross-section may include a first cross-beam 27 and a second cross-beam 27 extending between the upstream and downstream portions 21, 23 (e.g., generally parallel with the predominate wind direction 13) of the tower wall 20. It should be further understood that, in other embodiments, the tower structure 12 may include more than two cross-beams 27, such as three or more.

Figure 6:
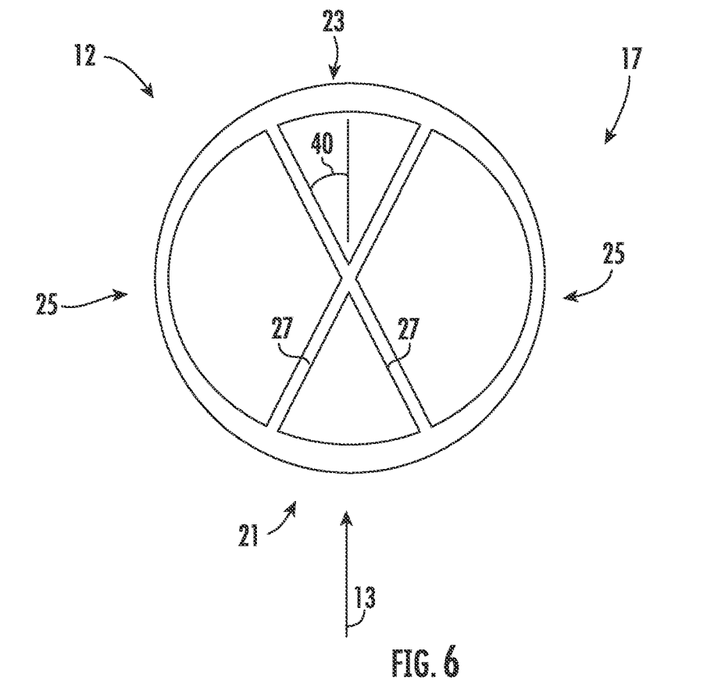
FIG. 6 illustrates another embodiment of the tower structure in accordance with aspects of the present disclosure, particularly illustrating a cross-section of the optimized tower structure including cross-beams configured in an x-pattern.

Referring now to FIG. 6, another embodiment of the tower structure 12 is illustrated in accordance with aspects of the present disclosure. Particularly, FIG. 6 illustrates a cross-section of the optimized tower structure 12 including cross-beams 27 configured in an x-pattern. For example, each of the cross-beams 27 may define an angle 40 relative to the predominate wind direction 13. In certain embodiments, the angle 40 may be at least five degrees but less than forty degrees, such as at least ten degrees but less than thirty-five degrees. As such, the cross-beams 27 may cross one another as each cross-bream 27 extends between the upstream and downstream portions 21, 23 of the tower wall 20.

Referring specifically to FIGS. 4, 5, and 6, it should be appreciated that the I-beam, box beam, and/or x-patterned cross-sections may increase the bending stiffness of the tower structure 12 along the predominate wind direction 13 due to at least in part an increased thickness of the upstream and/or downstream portions 21, 23 of the tower wall 20. However, unlike the illustrated embodiment of FIG. 3, the cross-beam(s) 27 may further increase the bending stiffness along the predominate wind direction 13. Though, in other embodiments, the upstream and/or downstream portions 21, 23 may still define the same thickness as the side portions 25 of the tower wall 20. In such an embodiment, the cross-beam(s) 27 may increase in the bending stiffness along the predominate wind direction 13. It should be appreciated that, in such embodiments, the cross-sectional shape may include at least one of a hollow cross-section or a solid cross-section.

Figure 7:
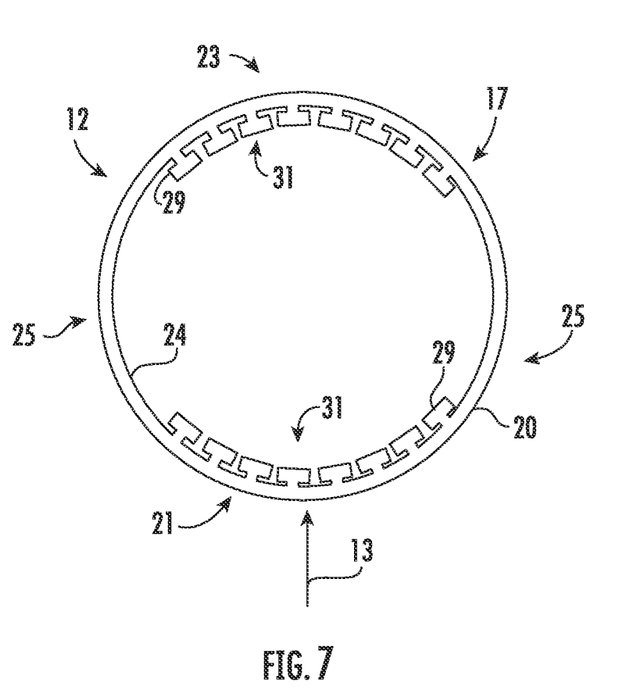
FIG. 7 illustrates a still further embodiment of the tower structure in accordance with aspects of the present disclosure, particularly illustrating a cross-section of the optimized tower structure including one or more stiffening members.

Referring now to FIG. 7, still a further embodiment of the tower structure 12 is illustrated in accordance with aspects of the present disclosure. Particularly, FIG. 7 illustrates a cross-section of the tower structure 12 including one or more stiffening members 29 on an inner surface 24 of the tower structure 12 to form the optimized shape 17. As shown, the stiffening members 29 may be on an inner surface 24 of the tower wall 20. Further, as shown, the stiffening member(s) 29 may be oriented to generally align with the predominate wind direction 13. For instance, the stiffening member(s) 29 may be positioned on the inner surface 24 of the upstream and/or downstream portions 21, 23 of the tower wall 20. In further embodiments, as shown, the cross-sectional shape of the tower structure 12 may include a plurality of stiffening members 29 on the inner surface 24 of at least one of the upstream or downstream portions 21, 23. For example, in the depicted embodiment, the stiffening members 29 may be configured in an isogrid 31 including a plurality of individual stiffening members 29 positioned adjacent to one another. Further, one of or both of the upstream and downstream portions 21, 23 of the tower wall 20 may include stiffening members 29 arranged in an isogrid 31. Still further, one of the upstream or downstream portions 21, 23 may include stiffening members 29 in an isogrid 31 while the other of the portions 21, 23 includes one or more individual stiffening members 29.

Figure 8:
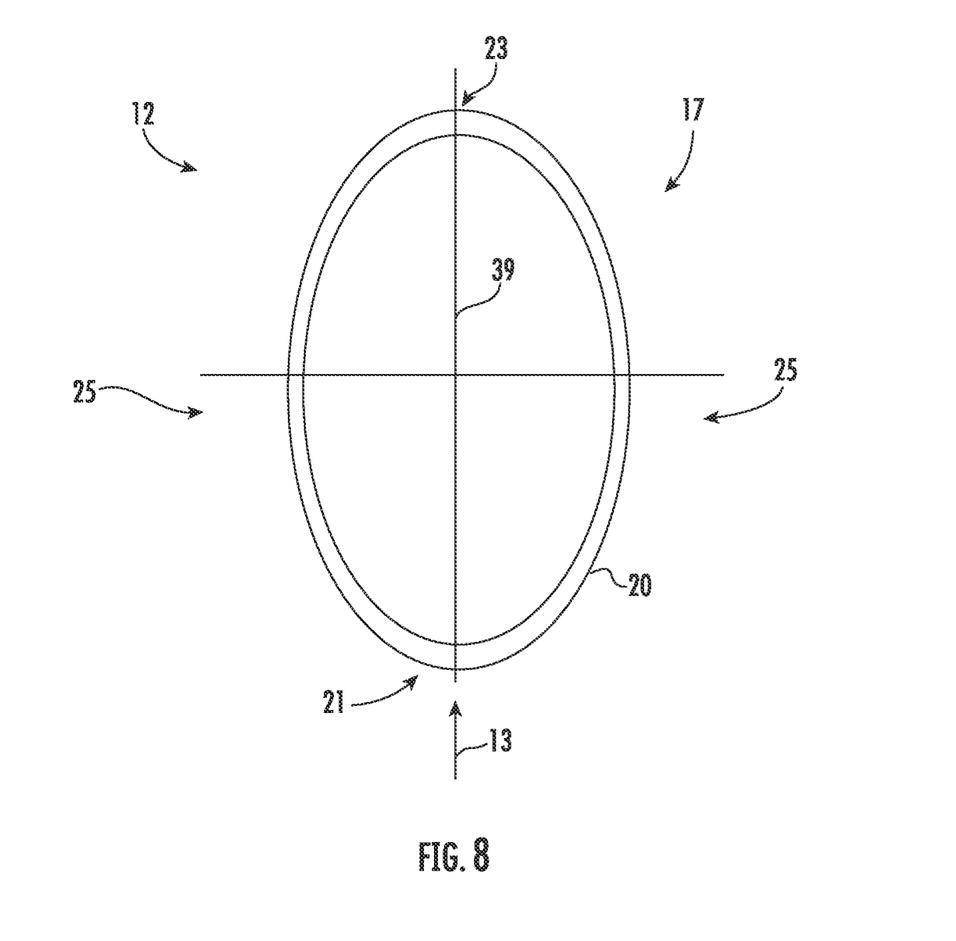
FIG. 8 illustrates another embodiment of the tower structure in accordance with aspects of the present disclosure, particularly illustrating a cross-section of the tower structure configured as an elliptical cross-section.

Referring now to FIG. 8, another embodiment of the tower structure 12 is illustrated in accordance with aspects of the present disclosure. Particularly, FIG. 8 illustrates a cross-section of the tower structure 12 configured as an elliptical cross-section. Further, as shown, the elliptical cross-sectional shape may also be oriented along the predominate wind direction 13. For instance, the elliptical cross-section may define a longitudinal axis 39 that aligns with the predominate wind direction 13. Moreover, the elliptical cross-sectional shape may increase the bending stiffness along the predominate wind direction 13. More particularly, an elliptical cross-section may place the upstream and/or downstream portions 21, 23 of the tower wall 20 farther from the center of the tower structure 12 relative to the side portions 25. As such, the second moment of area of the tower structure 12 may be increased along the predominate wind direction 13, and thus increase the bending stiffness along the predominate wind direction 13.

Though illustrated in separate embodiments in FIGS. 3-8, it should be appreciated that the optimized shape 17 of the tower structure 12 may include any combination of the features of the embodiments of FIGS. 3-8. For instance, in one embodiment, an elliptically shaped tower structure 12 may define an increased thickness at the upstream portion 21 and downstream portion 23, one or more cross-beams 27, and one or more stiffening members 29.

Referring now to FIGS. 9-12, the present disclosure is directed to methods for manufacturing wind turbine towers via additive manufacturing. Additive manufacturing, as used herein, is generally understood to encompass processes used to synthesize three-dimensional objects in which successive layers of material are formed under computer control to create the objects. As such, objects of almost any size and/or shape can be produced from digital model data. It should further be understood that the additive manufacturing methods of the present disclosure may encompass three degrees of freedom, as well as more than three degrees of freedom such that the printing techniques are not limited to printing stacked two-dimensional layers, but are also capable of printing curved and/or irregular shapes.

Figure 9:
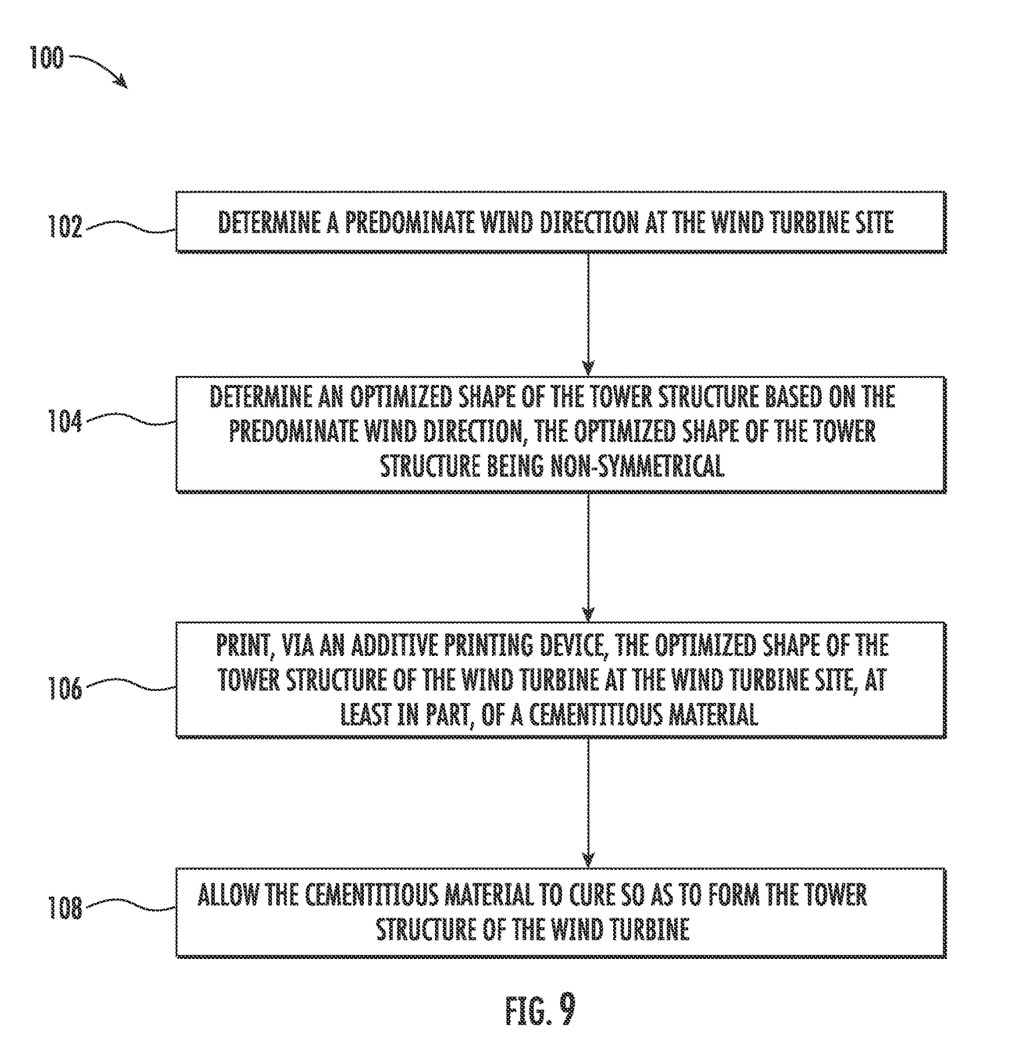
FIG. 9 depicts a flow diagram of one embodiment of a method for manufacturing a tower structure of a wind turbine at a wind turbine site in accordance with aspects of the present subject matter.

Referring particularly to FIG. 9, a flow diagram of one embodiment of a method 100 for manufacturing a tower structure of a wind turbine at a wind turbine site is depicted in accordance with aspects of the present subject matter. In general, the method 100 will be described herein with reference to the wind turbine 10 and the tower structures 12 shown in FIGS. 1-8. However, it should be appreciated that the disclosed method 100 may be implemented with tower structures having any other suitable configurations. In addition, although FIG. 9 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (104), the method 100 may include determining an optimized shape 17 of the tower structure 12 based on one or more site parameters. As explained in regards to FIG. 1, the site parameter(s) may include the elevation, site terrain, wind speed, and/or the predominate wind direction 13 at the wind turbine site 11. Further, the optimized shape 17 of the tower structure 12 may be non-symmetrical. For example, the optimized shape 17 may include any of the tower structures 12 of FIGS. 2-8 or any of combination of the features thereof, though it should be appreciated that other shapes are contemplated for the tower structure 12. For instance, the tower structure 12 may include any cross-sectional shape that increases the bending stiffness of the tower structure 12 based on the site parameter(s). Moreover, the optimized shape 17 of the tower structure 12 may vary along the height of the tower structure 12.

In one embodiment, the site parameter(s) may include the predominate wind direction 13. In such an embodiment, as shown at (102), the method 100 may include determining the predominate wind direction 13 at the wind turbine site 11. For example, as described in regard to FIG. 1, the predominate wind direction 13 may be determined based on historical data of real-time wind directions. In other embodiments, the predominate wind direction 13 may not be known at the wind turbine site 11. As such, the predominate wind direction 13 may be determined by the sensor(s) 19 and/or the controller 44 (FIG. 1) described herein.

Figure 10:
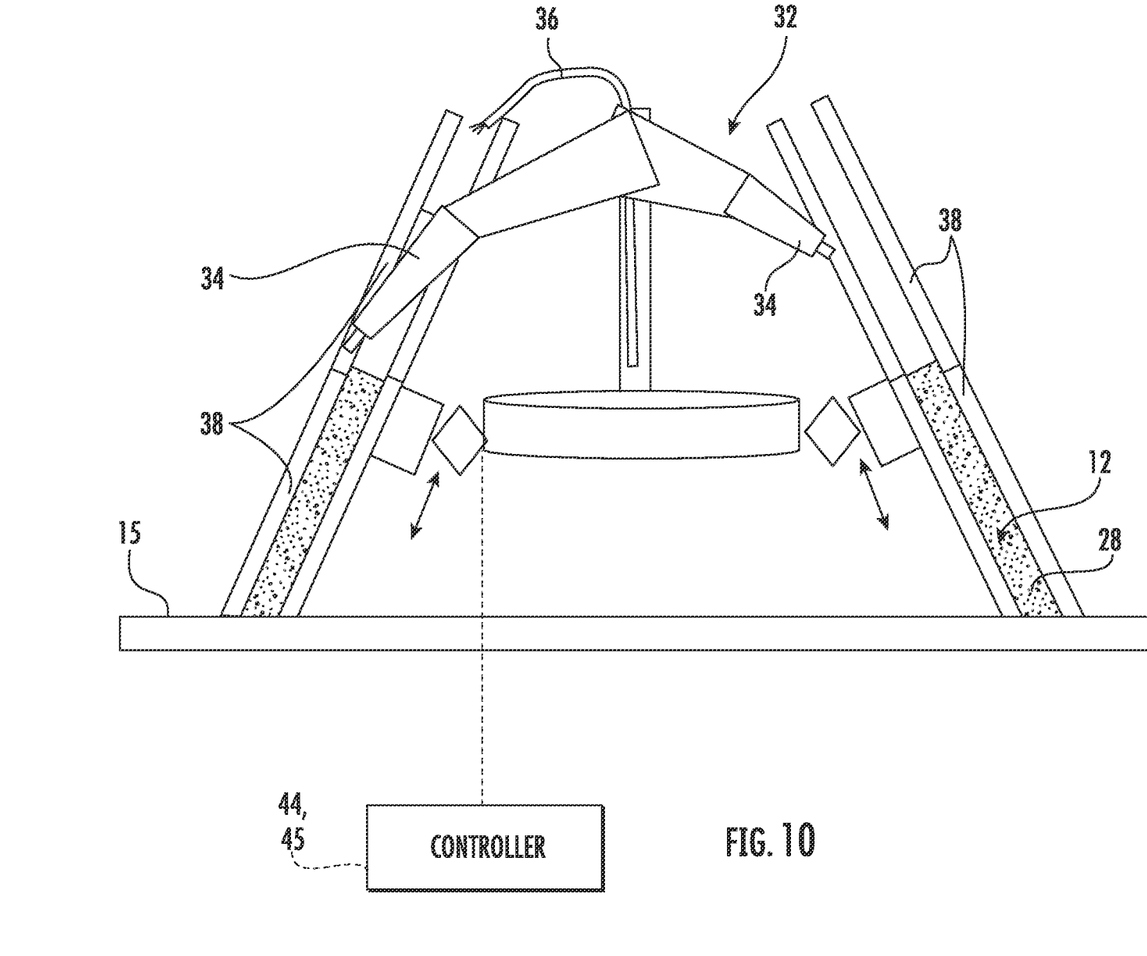
FIG. 10 illustrates a schematic diagram of one embodiment an additive printing device according to the present disclosure.

The method may include 100 may include forming the optimized shape 17 of the tower structure 12 of the wind turbine 10 at the wind turbine site 11, at least in part, of the cementitious material 28. For example, at least a portion of the wind turbine 10 may be formed from pre-fabricated concrete sections assembled into the optimized shape 17 of the tower structure 12. However, as shown at (106), the method 100 may include printing, via an additive printing device 32 (FIG. 10), the optimized shape 17 of the tower structure 12 of the wind turbine 10 at the wind turbine site 11, at least in part, of the cementitious material 28. For example, as shown in FIG. 10, a schematic diagram of one embodiment of the additive printing device 32 is illustrated in accordance with aspects of the present subject matter. It should be understood that the additive printing device 32 described herein generally refers to any suitable additive printing device having one or more nozzles 34 for depositing material (such as the cementitious material 28) onto a surface that is automatically controlled by a controller 44, 45 to form an object programmed within the computer (such as a CAD file). It should be appreciated that the controller 44, 45 may be the same controller 44 used to determine the predominate wind direction 13 (FIG. 1). Though, in other embodiments, the additive printing device 32 may be controlled via its own dedicated controller 45 that may or may not be in communication with the controller 44 used to determine the predominate wind direction 13. For example, the controller 44 that determines the predominate wind direction 13 may communicate the predominate wind direction 13 to the controller 45 that controls the additive printing device 32.

As shown, the additive printing device 32 may include one or more nozzles 34 for depositing various materials. For example, as shown in the illustrated embodiment, the additive printing device 32 includes two nozzles 34. In further embodiments, the additive printing device 32 may include any suitable number of nozzles 34. In addition, the additive printing device 32 may include an injector 36, which is discussed in more detail below. Further, it should be appreciated that the different sections of the tower structure 12 may be made from different materials. For example, a top section of the tower structure 12 near the nacelle 14 may be made from a metal (e.g., steel). Such metal may be printed by a dedicated nozzle 34, or pre-fabricated sections formed from metal may be assembled at the top of the tower structure 12.

Still referring to FIG. 10, the method 100 may include providing one or more molds 38, e.g. on the foundation 15 of the wind turbine 10. It should be understood that the molds 38 described herein may be solid, porous, and/or printed. In addition, in one embodiment, the mold(s) 38 may be prefabricated and delivered to the wind turbine site 11. In alternative embodiments, as shown in FIG. 10, the additive printing device 32 may also be configured to print the mold(s) 38. For example, as shown, one of the nozzles 34 may be configured to dispense a polymer material for building up the mold(s) 38 on the foundation 15 of the wind turbine 10 (or any other suitable on-site location). Suitable polymer materials may include, for example, a thermoset material, a thermoplastic material, a biodegradable polymer (such as a corn-based polymer system, fungal-like additive material, or an algae-based polymer system) that is configured to degrade/dissolve over time, or combinations thereof. As such, in one embodiment, the outer polymer mold may be biodegradable over time, whereas the inner polymer mold remains intact. In alternative embodiments, the outer and inner molds 38 may be constructed of the same material.

The one or more molds 38 may define the optimized shape 17 of the tower structure 12. More particularly, the mold(s) 38 may be printed to have any of the cross-sectional shapes of the tower structure 12 as described in regard to FIGS. 3-8. For example, the additive printing device 32 may define the outline of the I-beam of FIG. 4 such that the outline may be filled with the cementitious material 28. Though, in other embodiments, the method 100 may further include forming, via the additive printing device 32, the optimized shape 17 of the tower structure 12 of the wind turbine 10 within the one or more molds 38. For instance, forming the optimized shape 17 of the tower structure 12 via the additive printing device 32 may include printing the cementitious material 28 within the one or more molds 38. Printing the cementitious material 28 within the mold(s) 38 of the tower structure 12 may further include building up the cementitious material 28 of the tower structure 12 in multiple passes via the additive printing device 32. Further, it should be appreciated the tower structure 12 may be printed without the molds 38. For instance, any of the optimized shapes 17 of FIGS. 3-8 or the features thereof (e.g., the stiffening members 29) may be printed by the additive printing device 32. For instance, the cementitious material 28 may be printed layer by layer to define the tower structure 12.

In additional embodiments, an adhesive material may be provided between one or more of the cementitious material 28 and the foundation, the cementitious material 28 and the mold(s) 38, the cementitious material 28 and a metal material or polymer material, or multiple layers of the cementitious material 28, polymer material, and/or metal material. Thus, the adhesive material may further supplement interlayer bonding between materials.

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC". Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

The adhesive material described herein may include, for example, cementitious material such as mortar, polymeric materials, and/or admixtures of cementitious material and polymeric material. Adhesive formulations that include cementitious material are referred to herein as "cementitious mortar." Cementitious mortar may include any cementitious material, which may be combined with fine aggregate. Cementitious mortar made using Portland cement and fine aggregate is sometimes referred to as "Portland cement mortar," or "OPC". Adhesive formulations that include an admixture of cementitious material and polymeric material are referred to herein as "polymeric mortar." Any cementitious material may be included in an admixture with a polymeric material, and optionally, fine aggregate. Adhesive formulations that include a polymeric material are referred to herein as "polymeric adhesive."

In addition, the additive printing device 32 is configured to print the cementitious material 28 in a manner that accounts for the cure rate thereof such that the tower structure 12, as it is being formed, can bond to itself. In addition, the additive printing device 32 is configured to print the tower structure 12 in a manner such that it can withstand the weight of the tower wall 20 as the additively-formed cementitious material 28 can be weak during printing. Further, the reinforcing element(s) 30 of the tower structure 12 may be provided to enable the tower 12 to withstand wind loads that can cause the tower 12 to be susceptible to cracking.

Referring back to FIG. 9, as shown at (108), the method 100 may also include allowing the cementitious material 28 to cure so as to form the tower structure 12 of the wind turbine 10.

Figure 11:
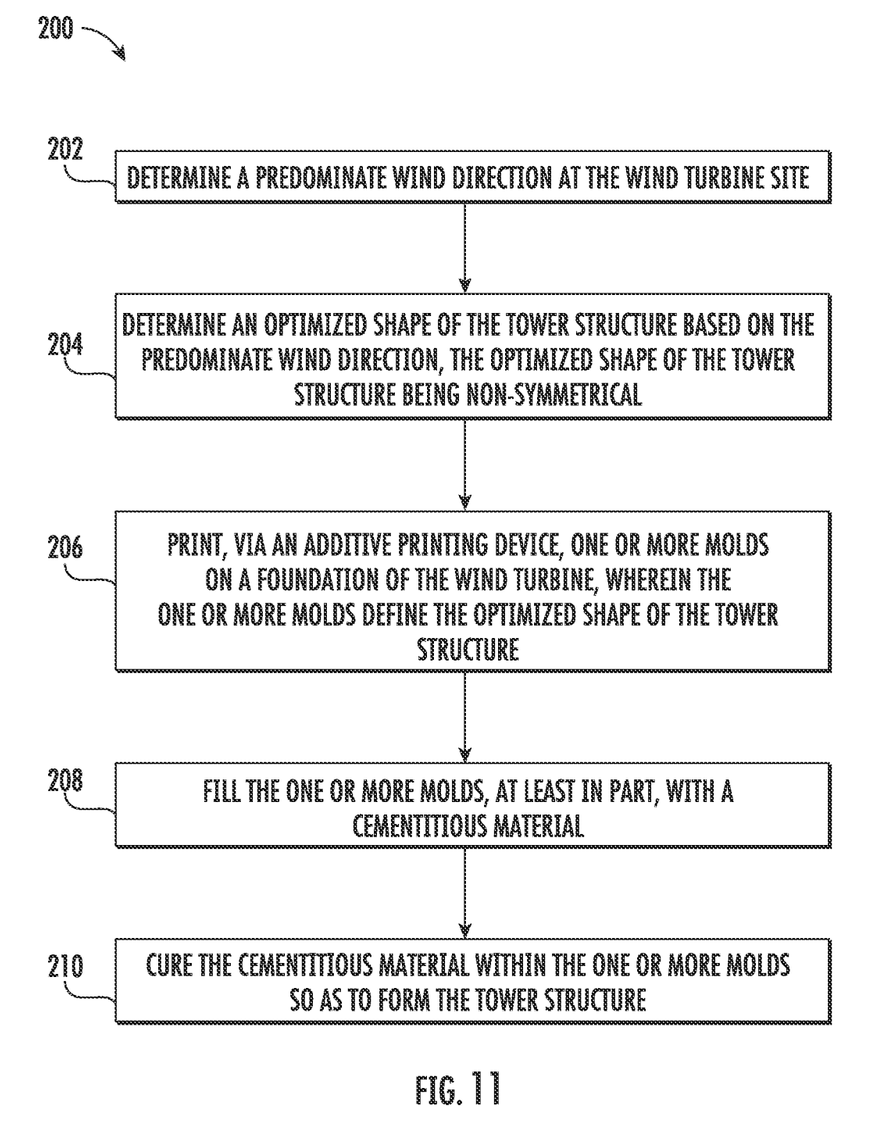
FIG. 11 depicts a flow diagram of another embodiment of a method for manufacturing a tower structure of a wind turbine at a wind turbine site in accordance with aspects of the present subject matter; and, FIG. 12 illustrates a block diagram of one embodiment of a controller according to the present disclosure.

Referring now to FIG. 11, a flow diagram of another embodiment of a method 200 for manufacturing a tower structure of a wind turbine at a wind turbine site is depicted in accordance with aspects of the present disclosure. In general, the method 200 will be described herein with reference to the wind turbine 10 and the tower structure 12 shown in FIGS. 1-8. However, it should be appreciated that the disclosed method 200 may be implemented with tower structures 12 having any other suitable configurations. In addition, although FIG. 11 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (202), the method 200 may include determining a predominate wind direction 13 at the wind turbine site 11. As shown at (204), the method 200 may include determining an optimized shape 17 of the tower structure 12 based on the predominate wind direction 13. Further, as mentioned, the optimized shape 17 of the tower structure 12 may be non-symmetrical. For example, the optimized shape 17 may include any of the tower structures 12 of FIGS. 2-8 or any of combination of the features thereof. As shown at (206), the method 200 may include printing, via the additive printing device 32, one or more molds 38 of the tower structure 12 on a foundation 15 of the wind turbine 10. As described herein, the mold(s) 38 may define the optimized shape 17 of the tower structure 12. More particularly, the mold(s) 38 may be printed in any of the cross-sectional shapes of the tower structure 12 as described in regards to FIGS. 3-8.

As shown at (208), the method 200 may include filling the one or more molds 38, at least in part, with the cementitious material 28. For instance, as described in regards to the method 100 of FIG. 10, one or more of the nozzles 34 of the additive printing device 32 may be configured to print the cementitious material 28 into the molds 38. However, in alternative embodiments, rather than printing the cementitious material 28, the injector 36 of the additive printing device 32 may simply inject or fill the mold(s) 38 with the cementitious material 28, e.g. by injecting the cementitious material 28 from the top of the mold(s) 38 or by injecting the cementitious material 28 through openings in the mold(s) 38. In such an embodiment, it should be appreciated that the optimized shape 17 of the tower structure 12 may entirely be determined by the mold(s) 38. Or, more particularly, an outline of the optimized shape 17 of the tower structure 12 may be defined in the mold(s) 38 during printing and subsequently filled with the cementitious material 28. As shown at (210), the method 200 may include curing the cementitious material 28 within the one or more molds 38 so as to form the tower structure 12.

Figure 12:
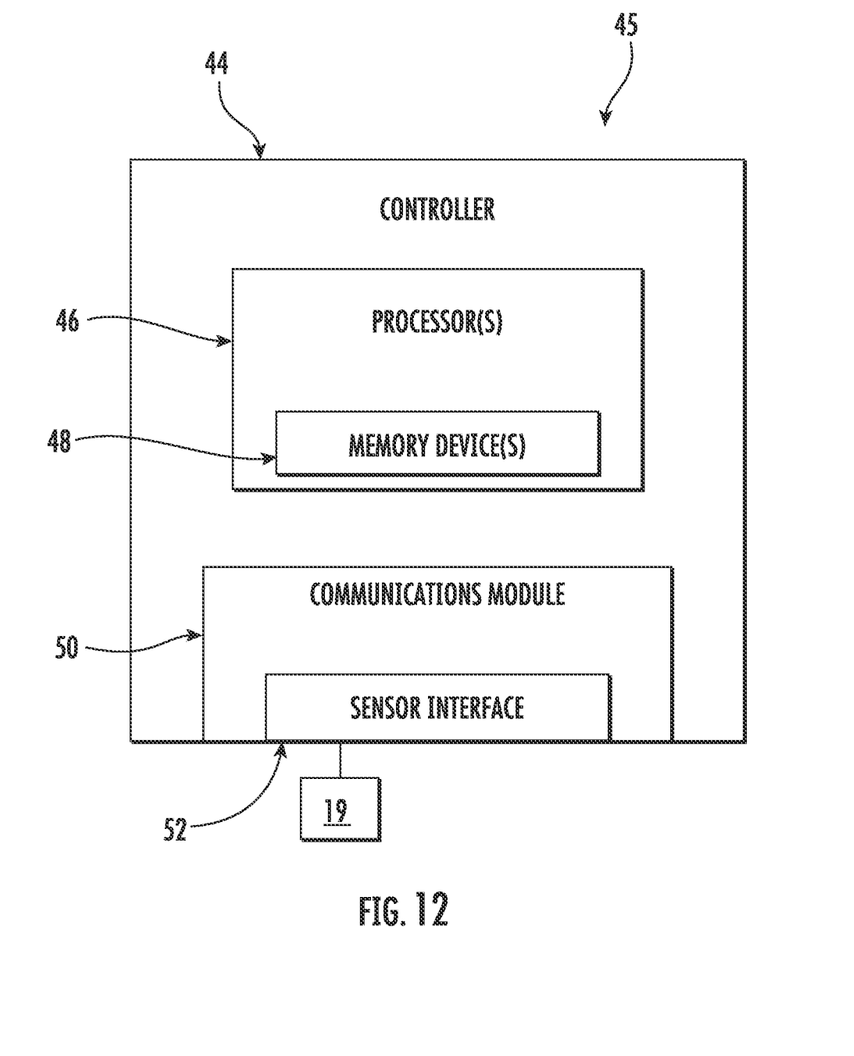

Referring now to FIG. 12, a block diagram of one embodiment of suitable components that may be included in a controller (such as the controller 44, 45 described herein) is illustrated in accordance with aspects of the present disclosure. As shown, the controller 44, 45 may include one or more processor(s) 46 and associated memory device(s) 48 configured to perform a variety of computer-implemented functions (e.g., performing the methods, steps, calculations and the like and storing relevant data as disclosed herein). Additionally, the controller 44, 45 may also include a communications module 50 to facilitate communications between the controller 44, 45 and the various components of the additive printing device 32. Further, the communications module 50 may include a sensor interface 52 (e.g., one or more analog-to-digital converters) to permit signals transmitted from one or more sensor(s) 19 to be converted into signals that can be understood and processed by the processors 46. It should be appreciated that the sensors (e.g. sensor(s) 19) may be communicatively coupled to the communications module 50 using any suitable means. For example, as shown in FIG. 11, the sensor(s) 19 may be coupled to the sensor interface 52 via a wired connection. However, in other embodiments, the sensor(s) 19 may be coupled to the sensor interface 52 via a wireless connection, such as by using any suitable wireless communications protocol known in the art. As such, the processor(s) 46 may be configured to receive one or more signals from the sensors.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. The processor 46 is also configured to compute advanced control algorithms and communicate to a variety of Ethernet or serial-based protocols (Modbus, OPC, CAN, etc.). Additionally, the memory device(s) 48 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 48 may generally be configured to store suitable computer-readable instructions that, when implemented by the processor(s) 46, configure the controller 44, 45 to perform the various functions as described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for manufacturing a tower structure of a wind turbine at a wind turbine site, the method comprising:
    determining an optimized shape of the tower structure based, at least in part, on a predominate wind direction at the wind turbine site;
    printing, via an additive printing device, the optimized shape of the tower structure of the wind turbine at the wind turbine site, at least in part, of a cementitious material; and
    allowing the cementitious material to cure so as to form the tower structure of the wind turbine,
    wherein the tower structure comprises one or more first portions aligned with the predominate wind direction and one or more second portions offset from the predominate wind direction,
    wherein the one or more first and second portions are printed with the cementitious material to form a monolithic part defining the tower structure, and
    wherein the one or more first portions are thicker than the one or more second portions.

2. The method of claim 1, further comprising determining the predominate wind direction by:
    monitoring, via one or more sensors, at least one wind parameter at the wind turbine; and
    determining, via a controller communicatively coupled to the one or more sensors, the predominate wind direction of the wind turbine based on the at least one wind parameter.

3. The method of claim 1, wherein the optimized shape of the tower structure defines a cross-sectional shape comprising at least one of an I-beam cross-section, a box beam cross-section, or an elliptical cross-section.

4. The method of claim 3, wherein the elliptical cross-section defines a longitudinal axis that aligns with the predominate wind direction.

5. The method of claim 1, further comprising:
    printing, via the additive printing device, one or more stiffening members onto an inner surface of the tower structure to form the optimized shape.

6. The method of claim 1, further comprising:
    providing one or more molds on a foundation of the wind turbine; and
    forming, via the additive printing device, the optimized shape of the tower structure of the wind turbine within the one or more molds.

7. The method of claim 6, further comprising printing, via the additive printing device, the one or more molds.

8. The method of claim 1, further comprising:
    during printing, embedding one or more reinforcement elements at least partially within the cementitious material of the tower structure at one or more locations.

9. A method for manufacturing a tower structure of a wind turbine at a wind turbine site, the method comprising:
    determining a predominate wind direction at the wind turbine site;
    determining an optimized shape of the tower structure based on the predominate wind direction;
    printing, via an additive printing device, one or more molds on a foundation of the wind turbine, wherein the one or more molds define the optimized shape of the tower structure;
    filling the one or more molds, at least in part, with a cementitious material; and
    curing the cementitious material within the one or more molds so as to form the tower structure,
    wherein the tower structure comprises one or more first portions aligned with the predominate wind direction and one or more second portions offset from the predominate wind direction,
    wherein the one or more first and second portions are printed with the cementitious material to form a monolithic part defining the tower structure, and
    wherein the one or more first portions are thicker than the one or more second portions.

10. The method of claim 9, wherein determining the predominate wind direction further comprises:

monitoring, via one or more sensors, at least one wind parameter at the wind turbine; and, determining, via a controller communicatively coupled to the one or more sensors, the predominate wind direction of the wind turbine based on the monitored at least one wind parameter.

11. The method of claim 9, wherein filling the one or more molds with a cementitious material further comprises printing, via an additive printing device, the cementitious material within the one or more molds, wherein printing the cementitious material within the one or more molds further comprises building up the cementitious material of the tower structure in multiple passes via the additive printing device.

12. The method of claim 9, wherein filling the one or more molds with a cementitious material further comprises dispensing, via a nozzle of the additive printing device, the cementitious material within the one or more molds.

13. The method of claim 9, wherein the optimized shape of the tower structure defines a cross-sectional shape comprising at least one of an I-beam cross-section, a box beam cross-section, or an elliptical cross-section.

14. The method of claim 13, wherein the elliptical cross-section defines a longitudinal axis that aligns with the predominate wind direction.

15. The method of claim 9, wherein the optimized shape of the tower structure defines one or more stiffening members on an inner surface of the tower structure to form the optimized shape.

16. The method of claim 9, further comprising:
during printing, embedding one or more reinforcement elements at least partially within the cementitious material of the tower structure at one or more locations.

17. A method for manufacturing a tower structure of a wind turbine at a wind turbine site, the method comprising:
determining a predominate wind direction at the wind turbine site;
determining an optimized shape of the tower structure based on the predominate wind direction; and
forming the optimized shape of the tower structure of the wind turbine at the wind turbine site, at least in part, of a cementitious materials
wherein the tower structure comprises one or more first portions aligned with the predominate wind direction and one or more second portions offset from the predominate wind direction,
wherein the one or more first and second portions are printed with the cementitious material to form a monolithic part defining the tower structure, and
wherein the one or more first portions are thicker than the one or more second portions.

* * * * *